No. 630,906. Patented Aug. 15, 1899.
T. C. MASSEY.
MEANS FOR CLASSIFYING LISTS OF NAMES.
(Application filed Jan. 14, 1899.)

(No Model.)

UNITED STATES PATENT OFFICE.

THOMAS C. MASSEY, OF CHICAGO, ILLINOIS.

MEANS FOR CLASSIFYING LISTS OF NAMES.

SPECIFICATION forming part of Letters Patent No. 630,906, dated August 15, 1899.

Application filed January 14, 1899. Serial No. 702,147. (No model.)

*To all whom it may concern:*

Be it known that I, THOMAS C. MASSEY, of Chicago, in the county of Cook and State of Illinois, have invented certain new and useful Improvements in Means for Classifying Lists of Names; and I do hereby declare that the following is a full, clear, and exact description thereof, reference being had to the accompanying drawings, and to the letters of reference marked thereon, which form a part of this specification.

This invention relates to an improved means for classifying lists of names of persons or things; and it consists in the matters hereinafter more fully set forth in the appended claims.

In the drawings, Figure 1 is a view illustrating a sheet of paper upon which has been printed a list of names arranged in connection with index marks and characters in accordance with my invention. Fig. 2 is a view of printing-rules such as are employed in carrying out my invention. Figs. 3, 4, and 5 show different forms of indicating or index marks.

In the drawings, A indicates a sheet of paper on which is marked or printed a list of names arranged one beneath another in a vertical column.

B B indicate horizontal lines marked or printed in the column between the several names and preferably extending the full width of the column, said lines dividing the column into a plurality of spaces each of which is appropriated to one name. At the top and bottom of the column are arranged like rows of index characters, disposed in horizontal lines and correspondingly arranged and located, so that like characters occupy corresponding positions at the top and bottom of the column. The index characters shown consist of the letters of the alphabet; but any other suitable series of signs or characters may be employed with the same result. The several index characters indicate the several classes of persons or things according to which the persons or things indicated by the names in the column are to be divided or classified.

$b\ b$ indicate index lines or marks, which are located one in the space appropriated to each name and differently disposed or located with respect to their lateral position in the column according to the spacing of the index characters $a\ a'$, so that each index-mark will be in alinement with the corresponding index characters at the top and bottom of the column. The said index-marks are disposed at fixed distances from the sides of the column, and the letters forming the names in the column are disposed with respect to said marks so that the marks will come between the letters or in some cases between words or in front of or behind the words. The index-mark located in each space or used in connection with each name is placed in a certain definite lateral position according to the class to which the name belongs and the classification indicated by the index characters at the top and bottom of the column, the lateral position of the index-mark appertaining to each name corresponding with the lateral position of the index character indicating the particular class to which the name belongs—as, for instance, the names may be those of persons and the index characters may indicate professions or occupations or financial standing. If the names are those of persons and the index characters indicate occupations, $a$ may represent grocers; $b$, druggists; $c$, butchers; $d$, blacksmiths, &c. In this instance the space appropriated for the name of any person who is a blacksmith will have printed or marked in it one of the marks $d$, in position corresponding with the index character appropriated to blacksmiths, and index-marks will be suitably applied in connection with all of the names in the list.

By the use of a column of names thus arranged and marked it becomes possible to easily classify the names or select all names belonging to each class from the list, it being necessary merely to note on the list all names having an index-mark in vertical alinement with the index character belonging to the desired class—as, for instance, if the names of all grocers are required, and grocers are indicated by $a$, then it is only necessary to note the index-marks coming under the index character $a$ and the names connected with these index-marks will be those of grocers. In the column illustrated as an instance the names "John Smith" and "Sam Brown" will be those of grocers. When the column is a long one and the names many, as in commercial reports and the like, the classification of the names will be aided by placing a straight-edged ruler with its edge vertically over the column and coinciding with the corresponding index characters at the top and bottom thereof, and when this is done the index-marks belonging to the desired class will fall in line with the edge of the ruler and may be readily noted, copied, or checked off.

The index-marks need not necessarily extend the full height of the spaces appropriated to the several names, nor need the said spaces be separated by horizontal lines, as shown in the accompanying drawings, nor need the index-marks be joined to the horizontal lines. The use of such horizontal lines is of advantage, however, as their presence greatly aids the eye in noting the position of the index-marks, especially if the same letter be joined to the said horizontal lines, as shown.

Lists of names provided with horizontal lines and index-marks, as described, may be easily printed from type by providing rules for printing the horizontal lines provided with integral vertical extensions for printing the index-marks. Such rules are shown in Fig. 2, from which it may be seen that the rules C are adapted to be placed between adjacent lines of type and the extensions c thereon are adapted to project upwardly between the types from which the words are printed or the "spaces" separating the letters in the lines. The projections c will be located at varying distances from the ends of the rules, according to the positions of the index characters of the column, and the rules may be classified or placed in compartments of a printer's case according to the classification to be indicated—as, for instance, the rules to be used for grocers, druggists, &c., may be kept in separate compartments, and in setting up the name of a grocer a rule from the "grocers'" compartment will be taken and in the case of the name of a druggist one from the "druggists'" compartment, and similarly for all classes embraced in the list, the types in each line being spaced or "justified" to correspond with the position of the projections on the rules.

Indicating characters may be used in connection with the names other than the straight lines illustrated in Figs. 1 and 2—as, for instance, the said characters may consist of parallel lines, as seen in Fig. 3, or a series of dots, as seen in Fig. 4, or a diamond figure, as seen in Fig. 5.

When the horizontal lines are not used, separate types may be provided for the index marks or characters, to be set up in the line of type in the usual manner. It will be preferred, however, that such type be attached to or formed on rules to be placed between the lines of type, even if such rules are not made high enough to make an impression, inasmuch as the proper spacing of individual type would be slow and troublesome, while all difficulty in this respect is avoided by the use of rules made and used as hereinbefore described.

The classifying means hereinbefore described is of great advantage for use in commercial reports and the like, for the reason that the classifying-marks described occupy much less room than those heretofore used, because avoiding the use of separate columns in which the classifying characters are placed and for the reason also that the names belonging to each class may be much more easily selected or noted by my construction than has been heretofore possible.

I claim as my invention—

1. The combination with a column of names, of a series of index characters arranged in the same column with the names transversely of the column and index-marks severally applied to the names, the said index-marks being laterally disposed in the said column to correspond with the said index characters.

2. The combination with a column of names, of a series of index characters arranged in the same column with the names transversely of the column, horizontal lines dividing the column into spaces for the names and a single index-mark located in the space appropriated to each name; the several index-marks being laterally disposed in the column to correspond with the index characters.

3. The combination with a column of names, of two corresponding series of index characters arranged in the same column with the names one arranged at the top and the other at the bottom of the column, and index-marks severally applied to the names, said marks being laterally disposed to correspond with the index characters.

4. The combination with a column of names, of a series of index characters arranged in the same column with the names and extending transversely of the column, and index-marks applied one to each name, said marks being located in the said column between or in line with the letters forming the names and being spaced laterally in said column to correspond with the said index characters.

5. A type for use in printing lists of names consisting of a rule having an integral projection on one side of the same, which projection bears a type for printing an index-mark.

In testimony that I claim the foregoing as my invention I affix my signature, in presence of two witnesses, this 11th day of January, A. D. 1899.

THOMAS C. MASSEY.

Witnesses:
C. CLARENCE POOLE,
BERTHA A. PRICE.